INVENTOR
LAWRENCE C. BENTLEY

United States Patent Office 2,961,094
Patented Nov. 22, 1960

2,961,094

CONTAINER EJECTOR MECHANISMS

Lawrence Cranmer Bentley, Keston, Kent, England, assignor to U.D. Engineering Company Limited, London, England, a company incorporated of Great Britain Filed Feb. 14, 1958, Ser. No. 715,405

Claims priority, application Great Britain Feb. 20, 1957

16 Claims. (Cl. 209—74)

This invention relates to improvements in container ejector mechanism and has for its object the provision of an improved mechanism for removing selected containers from a continuous succession of containers being advanced over a deadplate between guides by the introduction of other containers at the rear of the succession. It will be appreciated that although the invention is described in relation to apparatus dealing with milk bottles it is equally applicable to other containers having smoothed curved surfaces such for example as containers having an oval cross section and the term "cylindrical containers" is used herein to include milk bottles and other containers having curved smooth vertical walls.

In apparatus for the inspection of containers for possible contamination the problem arises of separating those containers which have been found to be contaminated from clean containers. For this purpose it is necessary to provide a selective ejector mechanism which will, at some point subsequent to the point at which the container is examined, cause those containers found to be contaminated to be separated from the line of clean containers passing onwards to be filled. In a particularly convenient arrangement for the inspection of containers, the containers are advanced to and past the point of inspection by a worm having a varying-pitch thread which moves the containers over a deadplate and holds each in turn momentarily stationary at the point at which inspection is effected. After inspection the containers are passed on over the deadplate between guides until they reach a line conveyor which takes them to the filling machine or other working station.

It is obviously most convenient to remove the containers, detected as being contaminated, at a point as close as possible to the position at which they are examined. This, however, introduces the difficulty that the bottles are being advanced by pressure from behind, so that it is not a simple matter to arrange that only a selected container shall be ejected.

According to the present invention there is provided apparatus for ejecting selected cylindrical containers from a succession of such containers moving over a deadplate along a path defined by guides under pressure from behind, comprising a guide member movable between a first position in which it deflects said containers from an initial generally rectilinear path and a second position in which it allows a containers to emerge from said defined path on to another area of said deadplate, a stop member arranged to move simultaneously with said guide member between a first position free of said defined path and a second position in which it arrests forward movement of that container occupying a position immediately preceding a container which is to be ejected, whereby the pressure upon said succession of containers causes the said latter container to pass from said defined path on to said other area of said deadplate, and means for ensuring that simultaneous movement of said guide and stop members may take place each time a selected container reaches the appropriate position in said path for ejection.

Preferably said stop member is advanced into said path by spring pressure such as to allow it to yield to the pressure of said containers rather than to damage them.

Where an ejector mechanism in accordance with the present invention is used in conjunction with inspection apparatus comprising a varying pitch worm for advancing the containers, it is preferable that the means for operating the ejector mechanism be driven by the same mechanical drive as the worm. This is very conveniently managed by arranging that the ejector mechanism is operated by a lever carrying a cam plate which is adapted to engage with followers in a drum rotated in mechanical synchronism with the worm through suitable gearing. These followers are arranged to be movable in the drum between one position in which they pass the cam plate and another in which they engage with it to operate the ejection mechanism. A device operated under the control of the sensing device of the inspection apparatus causes a follower to be driven into its operating position each time a contaminated container is detected. The phasing of the apparatus is so arranged that the follower will operate the ejector mechanism as the contaminated container reaches the appropriate position to be ejected.

From another aspect the invention comprehends a combination of a container ejection apparatus according to the invention and drive means for advancing said containers over said deadplate, said drive means comprising a revoluble worm disposed to engage containers moving in said defined path and in which the shaft carrying said follower drum is connected to a shaft carrying said worm by reduction gearing having a ratio equal to the number of followers carried by said drum.

In order that the present invention may be more clearly understood an embodiment in accordance therewith will now be described by way of example, with reference to the accompanying drawings, in which.

The same references are used in all the figures to designate the same parts.

Figure 1:
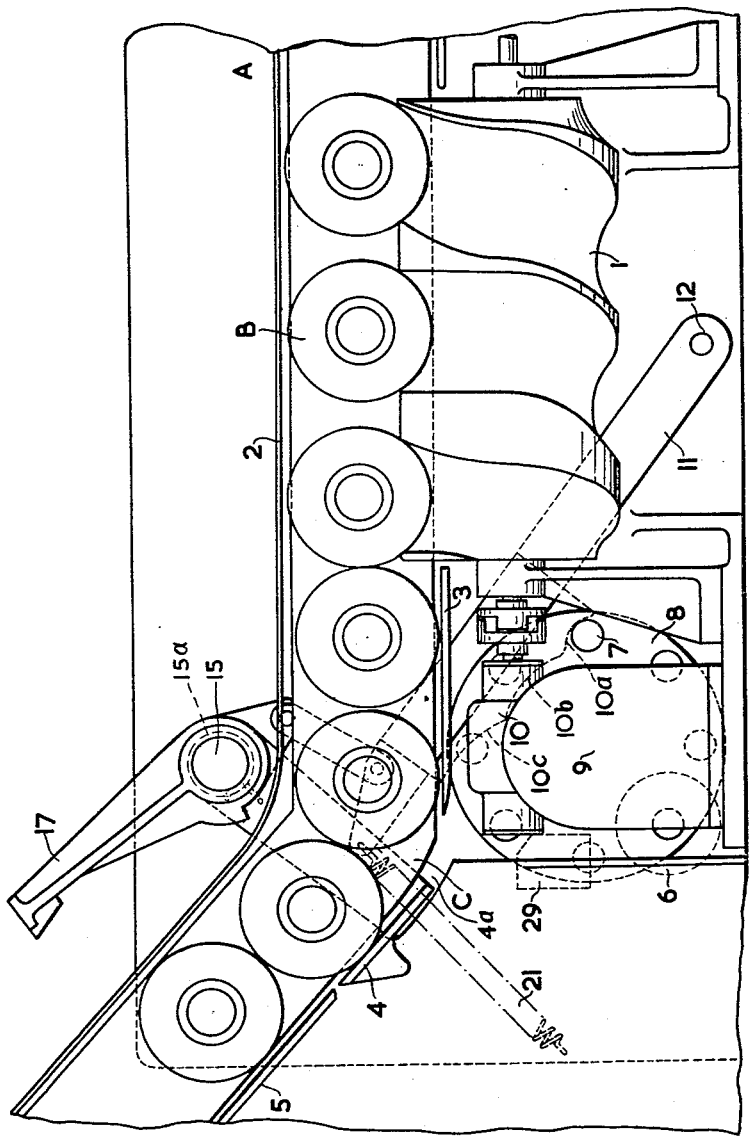
Figure 1 is a plan view of the part of a container inspection apparatus and of an ejector mechanism for ejecting a container selected by the inspection apparatus.

The apparatus illustrated is intended for the inspection of milk bottles but may be employed without any substantial modification for handling other cylindrical containers. The ejector mechanism is described with reference to a worm feed for the containers, but any container feed may be employed in which the containers are pushed forwards by engagement in succession one against another.

In the drawings, bottles to be inspected are supplied by a continuously moving conveyor of appropriate design (not shown as it forms no part of the present invention) to point A at which each in turn is engaged by a rotating varying pitch worm 1 which conveys each bottle in turn to a position B at which it is momentarily allowed to be stationary while the operation of inspection is performed. The bottle is then moved onwards between guide members 2 and 3 by the pressure of successive bottles thrust on by the worm 1 to the ejection point C where, provided that it has not been found to be contaminated, it is deflected from its initial generally rectilinear path by a first guide member 4 and passes on between guides 2 and 5 to arrive on a conveyor (not shown as it forms no part of this invention) by which they are taken to be filled or otherwise worked upon.

If however, a bottle is found to be contaminated the inspecting apparatus is arranged to supply a signal, e.g. a pulse of current to energise the coil of a seleniod 6 the armature in which is thus urged upwards to engage and raise one of eight captive followers 7 movably disposed in bores in and parallel to the axis of rotation of a drum 8 rotatable about a vertical axis which is driven in synchronism with the worm 1. The drum 8 is mounted on and rotated by a shaft operatively connected to the drive shaft of the worm 1 and the drive for the drum shaft from the worm shaft includes a reduction gearing contained in a casing 9 so that the drum rotates at one eighth of the speed of rotation of the worm. Any number of followers 7 may be employed the said reduction gearing having a ratio equal to the number of followers. When the bottle which was found by the inspection apparatus to be contaminated reaches position C, that follower 7 which was raised from a first or inoperative position to a second or operative position by the armature of the solenoid 6 when contamination in a container was detected, engages a cam plate 10; the cam plate 10 is secured to a lever 11 pivoted to the framework of the apparatus at 12 and joined by a pivoted link 13 to a crank 14 fast on a shaft 15 which moves in a suitable bearing (not shown) secured to the framework of the apparatus. On shaft 15 is fixed an arm 16, which carries at its end the guide member 4. The arm 16 is disposed below the deadplate and the guide member 4 projects upwardly perpendicular to the arm 16, through an arcuate slot 4a in the deadplate. An arm 17 is secured to a bushing freely rotatably mounted on the shaft 15 and helical spring 15a is disposed round the shaft, preferably in the bushing of the arm 17; the spring 15a is anchored to arm 16 and to the arm 17 to urge the arm 17 in an anti-clockwise direction in Figure 1. The rotation of the arm 17 about the shaft 15 is limited by a nose 18 formed in it which engages an abutment in the form of a screw 19 fitted in a post mounted on arm 16, the arm being disposed below the arm 17 so as to pass beneath the deadplate.

Figure 2:
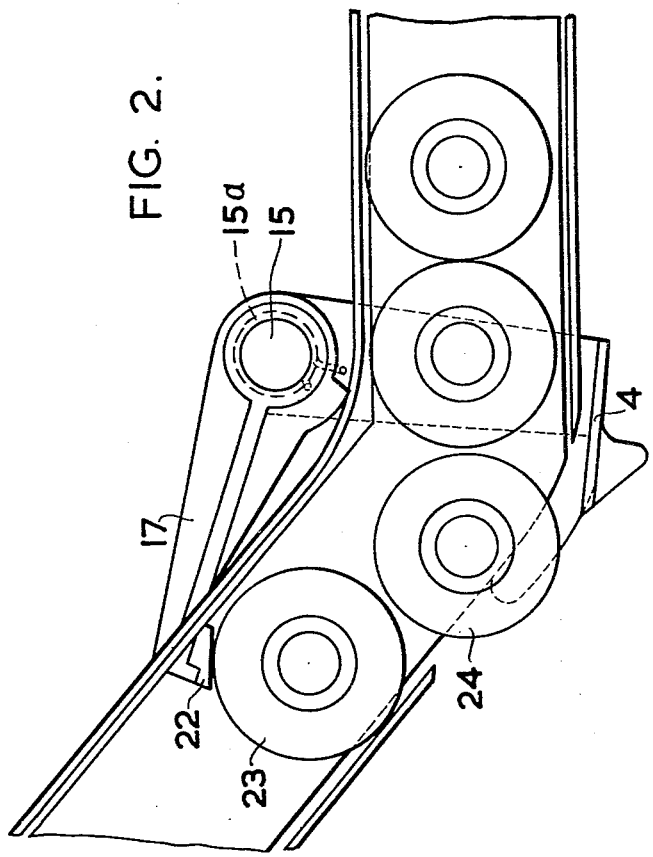
Figure 2 is a partial plan similar to Figure 1 showing the ejector operation.

When one of followers 7 is raised by the armature of solenoid 6, as a result of a contaminated bottle being selected by the inspection apparatus, said follower engages the edge of cam-plate 10 and causes lever 11 to move in a clockwise direction about its pivot 12 against the pull of a return spring 21 which is secured between the end of lever 11 and the framework of the apparatus, so that link 13 causes shaft 15 to turn in an anti-clockwise direction. The dimensions are so chosen that guide member 4 moves as shown in Figure 2 to open a way for the contaminated bottle on to a reception deadplate. At the same time arm 17, the end of which is furnished with a resilient pad 22 for example of rubber passes through an aperture in guide 2 so that the pad engages the clean bottle 23 which preceded the contaminated bottle 24. As the next bottle leaves worm 1 the pressure is transmitted through the intervening bottles and due to the bottles being out of alignment causes the contaminated bottle to be ejeced by the botles on either side of it on to the reception deadplate area whence it may be removed in any desired manner. The cam plate 10 as seen in Figure 1 has an indented cam surface with a hollow 10a, a second and longer hollow 10b and a final curved hollow 10c; the hollows 10a, 10b and 10c are so shaped that, since the raised followers 7 move on a circle concentric with the drum 8, the raised followers will move the lever 11 clockwise and hold it steady in the displaced position with the arms 16, 17 in the ejecting position until the contaminated bottle is ejected. Immediately the contaminated bottle moves clear of the main path the follower 7 moves away from the hollow 10c whereby the guide member 4 and arm 17 are allowed to return to their normal position under the pull of spring 21, so that a following clean bottle will be deflected along the correct path. If it should happen that two successive bottles are contaminated then member 4 and arm 17 do not move after the first has been ejected, since the second of the two raised followers will engage cam-plate 10 before the first has left it. If a single clean bottle is found between two contaminated bottles, then the guide member 4 does not return fully to its normal position due to the appropriate follower 7 engaging the face 10c of the cam 10, but nevertheless the guide member 4 is adaquately placed to divert the clean bottle along its proper course before opening again to allow the ejection of the second contaminated bottle. Should a bottle become trapped between the stop member and the guide member 4, the spring between the arms 16, 17 will yield and avoid damage to the trapped bottle which is freed to pass the stop member.

Figures 3, 4:
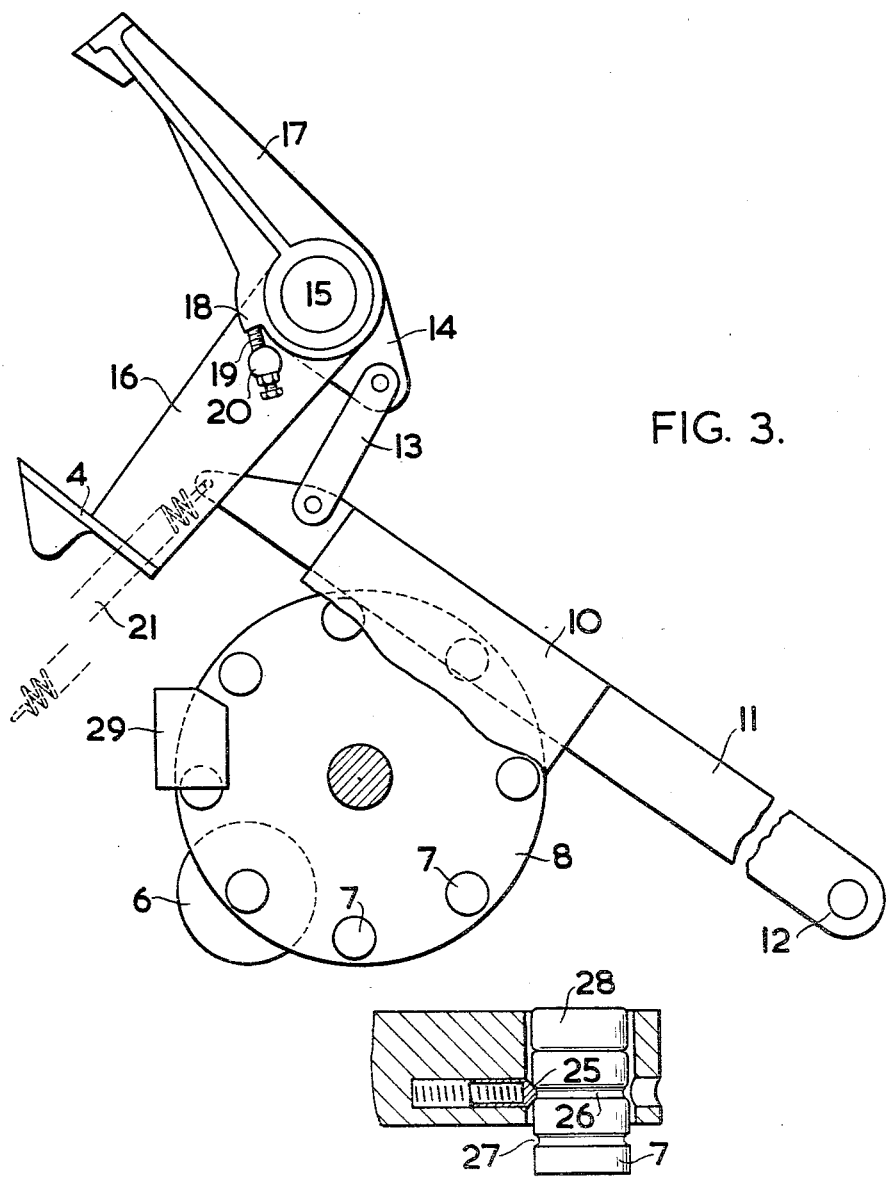
Figure 3 is a plan of the ejector operating mechanism shown in Figure 1.
Figure 4 is a detail of the arrangement of cam-follower used in the mechanism shown in Figure 3.

The followers 7 are retained in drum 8, as shown in Figure 4, by a spring-loaded detent 25 held in a bore in the drum and arranged to engage with a groove 26 in the follower body when the follower is in its normal position and with another groove 27 when the follower is raised to engage a cam-plate 10. Each follower carries on its upper end a roller 28 which, when the follower is raised, strikes against the cam-plate. After a raised follower has left the cam-plate 10 it passes under a second guide member in the form of a return ramp 29 which returns it to its initial lowered position.

It will be seen that with the ejection apparatus according to the invention a simple mechanism is provided readily responsive to a signal from an inspection apparatus which enables a contaminated bottle or other cylindrical container to be ejected. The ejector apparatus is capable of working accurately at speeds comparable with the working speed of the conventional inspection apparatus, for example at a feed rate of 200 bottles a minute.

I claim:

1. An apparatus for ejecting selected cylindrical containers from a succession of such containers moving over a deadplate along a path defined by guides under pressure from behind, comprising a guide member movable between a first position in which it deflects said containers from an initial, generally rectilinear path and a second position in which it allows a container to emerge from said defined path on to another area of said deadplate, a stop member arranged to move simultaneously with said guide member between a first position free of said defined path and a second position in which it arrests forward movement of that container occupying a position immediately preceding a container which is to be ejected, whereby the pressure upon said succession of containers causes said latter container to pass from said defined path on to said other area of said deadplate, and means for ensuring that simultaneous movement of said guide and stop members may take place each time a container reaches the appropriate position in said path.

2. An apparatus according to claim 1 in which said guide member and said stop member are each carried on an arm projecting radially from a common shaft and rotatable about the axis of said shaft.

3. An apparatus for ejecting selected cylindrical containers from a succession of such containers moving over a deadplate along a path defined by guides under pressure from behind, comprising a guide member carried by an arm fixed to a rotatable shaft, a stop member carried by an arm rotatably disposed on said shaft; an abutment on one of said arms, a spring anchored between said arms to urge said stop member arm to rotate about the axis of said shaft towards the guide member arm, and means for ensuring simultaneous movement of said guide member and said stop member between first positions in which the guide member deflects said containers from an initial generally rectilinear path and said stop member is free of said defined path and second positions in which the stop member arrests forward movement of that container occupying a position immediately preceding a container which is to be ejected and said guide member allows the container to be ejected to emerge from said defined path onto another area of said deadplate as a result of pressure upon said succession of containers, the means for ensuring simultaneous movement of said guide and stop members permitting said stop member to yield to pressure exerted by a container trapped between it and a guide.

4. An apparatus for ejecting selected cylindrical containers from a succession of such containers moving over a deadplate along a path defined by guides under pressure from behind comprising a guide member and a stop member each carried on an arm projecting radially from a common shaft and rotatable about the axis of said shaft, the stop member arm being freely rotatable about said shaft, and the guide member arm being fixed to rotate with said shaft, a spring anchored between said arms, an adjustable abutment attached to said guide member arm against which said spring urges said stop member arm, and means for ensuring simultaneous movement of said guide member and said stop member each time a selected container reaches the appropriate position of ejection in said path, whereby when said stop member arrests a container in said defined path the pressure upon said succession of containers causes the container to be ejected to pass from said defined path on to said other area of said deadplate, and said spring permits said stop member to yield to pressure exerted by a container trapped between it and a guide.

5. An apparatus according to claim 1 in which said stop member when in said second position projects into said defined path through an aperture in one of said guides.

6. An apparatus according to claim 1 in which said stop member is provided with a resilient pad affixed to that part thereof which engages said containers.

7. An apparatus according to claim 4 in which said guide member is in the form of a flat plate arranged substantially perpendicular to that arm by which it is supported from said shaft so as to project upwardly through an arcuate slot in said deadplate.

8. An apparatus for ejecting selected cylindrical containers from a succession of such containers moving over a deadplate along a path defined by guides under pressure from behind, comprising a first guide member carried by an arm fixed to a rotatable shaft, a stop member carried by an arm rotatably disposed on said shaft, an abutment on one of said arms, a spring anchored between said arms to urge said stop member arm to rotate about they axis of said shaft towards the first guide member arm, a drum rotatable in synchronism with drive means to which the ejector aparatus is to be fitted to urge said containers along said defined path, a plurality of followers carried by said drum and movable, as said drum rotates, from a first inoperative position to a second operative position, selectively operable means movable in response to a signal from a container inspection device to which said apparatus is to be fitted to displace said followers selectively from the inoperative to the operative position, and a cam plate carried on a member of a lever linkage connected to said first guide and stop member arms to move said arms, when one of said followers displaced by said selectively operable means engages said cam plate, between first positions in which the first guide member deflects said containers from an initial generally rectilinear path and said stop member is free of said defined path and second positions in which the stop member arrests forward movement of that container occupying a position immediately preceding a container which is to be ejected and said first guide member allows the container to be ejected to emerge from said defined path onto another area of said deadplate as a result of pressure upon said succession of containers.

9. An apparatus according to claim 8 in which the selectively operable means for moving each of said followers from said first to said second position comprises a solenoid so disposed that its armature will, when its coil is energised by an appropriate current, engage a follower.

10. An apparatus according to claim 8 in which said followers are carried in bores formed in and parallel to the axis of rotation of said drum.

11. An apparatus according to claim 8 in which said followers are of generally cylindrical form and are each formed with two spaced circumferential grooves in which a spring-loaded detent carried within said drum engages respectively in said first and second positions of said followers.

12. An apparatus according to claim 8 in which each said follower is provided with a roller which when said follower is in said second position will engage said cam plate.

13. An apparatus according to claim 8 in which a guide member is disposed to return said followers from said second to said first position as they are carried by said drum from engagement with said cam plate.

14. An apparatus according to claim 8 in which the form of said cam plate is such that if successive followers in said drum are in said second position the latter follower engages said cam plate while said first guide member and said stop member are in said second position.

15. In combination an apparatus according to claim 16 and drive means for advancing said containers over said deadplate, said drive means comprising a revoluble worm disposed to engage containers moving in said defined path and in which the shaft carrying said follower drum is connected to a shaft carrying said worm by reduction gearing having a ratio equal to the number of followers carried by said drum.

16. An apparatus for ejecting selected cylindrical containers from a succession of such containers moving over a deadplate along a path defined by guides under pressure from behind, comprising a first guide member carried by an arm fixed to a rotatable shaft, a stop member carried by an arm rotatably disposed on said shaft, an abutment on one of said arms, a spring anchored between said arms to urge said stop member arm to rotate about the axis of said shaft towards the first guide member arm, a drum rotatable in synchronism with drive means to which the ejector apparatus is to be fitted to urge said containers along said defined path, a plurality of followers carried by said drum and movable, as said drum rotates, from a first inoperative position to a second operative position, selectively operable means movable in response to a signal from a container inspection device to which said apparatus is to be fitted to displace said followers selectively from the inoperative to the operative position, a cam plate carried on a member of a lever linkage connected to said first guide and stop member arms to move said arms, when one of said followers displaced by said selectively operable means engages said cam plate, between first positions in which the first guide member deflects said containers from an initial generally rectilinear path and said stop member is free of said defined path and second positions in which the stop member arrests forward movement of that container occupying a position immediately preceding a container which is to be ejected and said first guide member allows the container to be ejected to emerge from said defined path onto another area of said deadplate as a result of pressure upon said succession of containers, the form of said cam plate being such that if successive followers in said drum are in said second position the latter follower engages said cam plate while said first guide member and said stop member are in said second position, and a second guide member disposed to return said followers from said second to said first position as they are carried by said drum from engagement with said cam plate.

(References on following page)

References Cited in the file of this patent

UNITED STATES PATENTS

| | | |
|---|---|---|
| 2,196,389 | Fogg et al. | Apr. 9, 1940 |
| 2,217,342 | Ladrach | Oct. 8, 1940 |
| 2,324,782 | Kronquest | July 20, 1943 |
| 2,336,606 | Everett | Dec. 14, 1943 |
| 2,357,801 | Arelt | Sept. 12, 1944 |
| 2,368,796 | Ardell | Feb. 6, 1945 |
| 2,393,188 | Reynolds | Jan. 15, 1946 |
| 2,596,342 | McNutt | May 13, 1952 |
| 2,896,784 | Greenamyer | July 28, 1959 |